(12) United States Patent
Niu et al.

(10) Patent No.: US 7,069,490 B2
(45) Date of Patent: Jun. 27, 2006

(54) METHOD FOR RETRANSMISSION OF LOST PACKET IN FADING CHANNELS

(75) Inventors: Zhisheng Niu, Beijing (CN); Jing Zhu, Beijing (CN)

(73) Assignees: Tsinghua University, Beijing (CN); Fujitsu Limited, Kawasaki (JP)

( * ) Notice: Subject to any disclaimer, the term of this patent is extended or adjusted under 35 U.S.C. 154(b) by 800 days.

(21) Appl. No.: 09/933,893

(22) Filed: Aug. 21, 2001

(65) Prior Publication Data
US 2002/0069388 A1    Jun. 6, 2002

(30) Foreign Application Priority Data
Oct. 20, 2000    (CN)    ................................. 00130335

(51) Int. Cl.
*H04L 1/18*    (2006.01)
*G08C 25/02*    (2006.01)
(52) U.S. Cl. ...................... 714/748; 370/335; 370/394; 370/428; 370/216
(58) Field of Classification Search ................ 714/748; 370/335, 394, 428, 216
See application file for complete search history.

(56) References Cited

U.S. PATENT DOCUMENTS

| | | | | |
|---|---|---|---|---|
| 4,559,625 A | * | 12/1985 | Berlekamp et al. | ......... 714/701 |
| 4,621,359 A | * | 11/1986 | McMillen | ................... 370/235 |
| 6,567,388 B1 | * | 5/2003 | Tomcik et al. | ............... 714/748 |
| 6,581,176 B1 | * | 6/2003 | Seo | ............................. 714/749 |
| 2002/0114292 A1 | * | 8/2002 | Kawabata et al. | ........... 370/329 |

OTHER PUBLICATIONS

Bao, "Performance evaluation of TCP/RLP protocol stack over CDMA wireless link," 1996, Kluwer Academic Publishers, Wireless Networks vol. 2, Issue 3, pp. 229-237.*
Jeon et al., "Improved Selective Repeat ARQ Scheme for Mobile Multimedia Communications," Feb. 2000, IEEE Communication Letters, vol. 4, Issue 2, pp. 46-48.*
Weldon, "An Improved Selective-Repeat ARQ Strategy," Mar. 1982 IEEE Transactions on Communications vol. COM-30, No. 3, pp. 480-485.*
Jolfaei et al., "Improved Selective Repeat ARQ Schemes for Data Communication," Jun. 1994, 1994 IEEE 44th Vehicular Technology Conference, pp. 1407-1411.*

(Continued)

*Primary Examiner*—Guy J. Lamarre
(74) *Attorney, Agent, or Firm*—Katten Muchin Rosenman LLP (57) ABSTRACT

A method of retransmitting of a lost packet in a mobile communication system in which multiple copies plus delays occur i.e. after a transmitter has received from a receiver a negative acknowledgement (NACK) signal, which points to a specific data packet, multiple copies of the specific data packet are retransmitted with a delay, which is inserted between two consecutive copies. The number of multiple copies can be acquired by a linear or exponential calculation according to the current number of retransmission. The specific retransmission method may be the interleaving transmission method, which transmits a retransmission queue in the interleaving retransmission interval; or the multiple queues polling transmission method, which transmits the retransmission queue by copy queues sequence. In the correlated fading channels, the method of the present invention can decrease the number of retransmissions, and at the same time it can increase efficiency of each retransmission.

17 Claims, 5 Drawing Sheets

OTHER PUBLICATIONS

TIA/EIA/IS-707-A.2 (PN-4145.2), "Data Service Options for Spread Spectrum Systems: Radio Link Protocol," Mar. 1999.*

Fantacci, "Queuing Analysis of the Selective Repeat Automatic Repeat Request Protcol Wireless Packet Networks," May 1996, IEEE Transactions on vehicular technology, vol. 45. No. 2, pp. 258-264.*

Konheim, "A Queueing Analysis of Two ARQ Protocols," Jul. 1980, IEEE Transactions on communications, vol. com-28. No. 7, pp. 1004-1014.*

E. Dahlman, et al. "UMTS/IMT-2000 Based on Wideband CDMA", IEEE Communications Magazine, Vo. 36, No. 9, pp. 70-80, Sep. 1998.

A. Chockalingam, et al. "Performance of TCP/RLP Protocol Stack on Correlated Fading DS-CDMA Wireless Links" vol. 49, No. 1 IEEE Transactions on Vehicular Technology, Jan. 2000, pp. 28-33.

W.S. Jeon, et al. "Improved Selective Repeat ARQ Scheme for Mobile Multimedia Communications", IEEE Communications Letter, vol. 4, No. 2, Feb. 2000, pp. 46-48.

Q.Q. Zhang, et al. "Finite-State Markov Model for Rayleigh Fading Channels", IEEE Transaction Communications, vol. 47, No. 11, Nov. 1999, pp. 1688-1692.

H.M. Chaskar, et al., "TCP Over Wireless with Link Level Error Control: Analysis and Design Methodology", IEEE/ACM Transactions on Networking, vol. 7, No. 5, Oct. 1999, pp. 605-615.

M. Zorzi, et al. "On the Accuracy of a First-Order Markov Model for Data Transmission on Fading Channels" In proc. IEEE ICUPC'95, Tokyo, Japan, pp. 211-215, Nov. 1995.

* cited by examiner

METHOD FOR RETRANSMISSION OF LOST PACKET IN FADING CHANNELS

BACKGROUND OF THE INVENTION

1. Field of the Invention

The invention concerns an effective and reliable transmission technique with a scheme for retransmission of a lost packet in correlated fading channels.

2. Prior Art

At present, Internet and mobile communication technology has development with a growing trend to converge them, thus requiring mobile communication service, originally providing voice transmission service only, to also provide data transmission service. Because of correlated fading characteristic of a wireless channel, data packets can be lost, so there is a problem of unreliable transmission. Reliable link layer protocols, such as Automatic Repeat Request (ARQ), are one method to provide reliable transmission in an unreliable transmission system. ARQ methods can be roughly classified into Stop-and-Wait (SW), Go-back-N (GN) and Selective Repeat (SR). Among them, SR-ARQ is the most efficient and has been widely used in practical mobile systems, for example IS-99 (TIA/EIA/IS-99, "Data Services Option Standard for Wideband Spread Spectrum Digital Cellular System", 1955).

Figure 1:
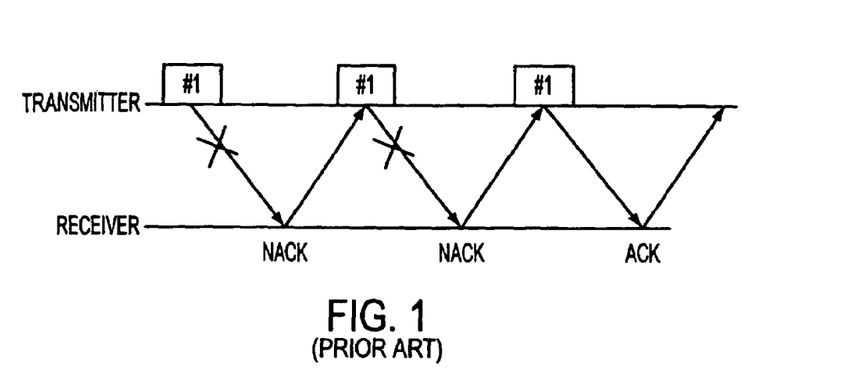
FIG. 1 is a schematic diagram of a typical SR-ARQ working procedure.

FIG. 1 shows a working procedure of Selective Repeat (SR-ARQ). When the receiver sends back the Acknowledge (ACK) or Negative Acknowledge (NACK), the transmitter determines whether a specific data packet (for example #1) is lost or not, and makes a selective retransmission. When the transmitter receives an ACK signal, it means the #1 packet has been received successfully, it is unnecessary to retransmit again. When the Transmitter receives a NACK signal, it means that the #1 packet has not been received successfully, it is a transmission failure, the packet is lost and it is necessary to retransmit. When there is retransmission, each time only one copy of the lost #1 packet is retransmitted. The figure shows that after two times retransmission of #1 packet copy, it is received successfully. This means that in the traditional SR-ARQ scheme, when a packet is lost, only one copy of the lost packet is retransmitted each time. Obviously, the worse the environment of transmission, the more times retransmission is needed. In this case the data packet has a longer persistence time in the transmitter buffer and will seriously decrease the quality of data service.

Naturally, when a data packet is lost, multiple copies of the lost data packet can be retransmitted each time. But in a mobile communication system, because of the instinctive burst error characteristics in correlated fading channels data packets are successively lost and if multiple copies are sent for each retransmission they will meet the same bad state of the fading channels at the same time and the retransmission is failure, i.e. retransmission efficiency is low. Therefore, in correlated fading channels the issue of decreasing the number of retransmissions and increasing retransmission efficiency are two big problems needing consideration.

SUMMARY OF THE INVENTION

It is an object of the invention to provide a retransmission method for lost packets in correlated fading channels that will decrease the number of retransmissions and increase the efficiency of each retransmission.

The above and other objects of the invention are implemented as follows. A retransmission method for lost packet in a fading channel is characterized in that: when the transmitter receives from a receiver in a mobile communications system, a negative acknowledgement (NACK), which points to a specific data packet, multiple copies of the specific data packet will be retransmitted, wherein a delay is inserted between two consecutive copies.

The number of multiple copies is acquired by calculation based on the number of current retransmissions of the specific data packet. The number of copies is increased along with an increase of the number of retransmissions.

In one embodiment, the method of the present invention used to retransmit lost packets in a fading channel, includes the following steps:

A. At least two queues are set in the transmitter, including a transmission queue and a retransmission queue;

B. New data packets, which will be transmitted, are stored in the transmission queue; the copies, the number of which are defined by current number of retransmission data packets, are stored in the retransmission queue;

C. It is determined whether the retransmission queue is in the state of empty or not, when the current retransmission queue is empty, with first-in-first-out principle, data packets in the transmission queue are transmitted; When the current retransmission queue is not empty, the data packet copies in the retransmission queue are transmitted with interleaving transmission;

D. The minimum value of time length of an interleaving retransmission interval is set by a timer, select one copy of every retransmission data packet from the retransmission queue, transmit them in every interleaving retransmission interval by the first-in-first-out principle; if before the end of a minimum value of interleaving retransmission interval time length, one copy of all data packets in the retransmission queue has been transmitted, then with the first-in-first-out principle, data packets in the transmission queue are transmitted until the end of the minimum value, set by the timer, of the interleaving retransmission interval time length. Then this interleaving retransmission interval will be ended and the next one will be started; if before the end of the minimum value of the interleaving retransmission interval time length, one copy of all data packets in the retransmission queue has been transmitted and the transmission queue is empty, then transmission stops until the end of the minimum value, set by the timer, of the interleaving retransmission interval time length. Then, this interleaving retransmission interval will be ended and the next one will be started; when an interleaving retransmission interval is ended and the retransmission queue is empty, then data packets in the transmission queue are transmitted by the first-in-first-out principle.

Another embodiment to retransmit a lost packet in a fading channel includes the following steps:

A. At least two queues are set in the transmitter, including a transmission queue and a retransmission queue;

B. New data packets, which will be transmitted, are stored in the transmission queue; copies, the number of which is defined by current number of retransmission data packet, are stored in the retransmission queue;

C. It is determined whether the current retransmission queue is in the state of empty or not, when the current retransmission queue is empty, with the first-in-first-out principle, data packets in the transmission queue are transmitted; when the current retransmission queue is not empty, the data packet copies in the retransmission queue are transmitted with multiple queue polling transmission;

D. Setting copy queues with a sequence number, each copy queue includes one copy of different data packet. Starting from the first copy queue, with the first-in-first-out principle, every data packet copy in each copy queue is transmitted in sequence.

Only after sending out all the copies in one queue, the next copy queue transmission can be started until the final copy queue. When all the copy queues are empty, then the polling transmission is ended and the transmission of the said transmission queue is started.

According to yet another embodiment a transceiver, in a mobile communication system, transmits a packet to a receiver or provides a plurality of copies of a special packet, when the transceiver receives information which indicates that the receiver does not receive the specific packet, the transceiver retransmits the specific packet in order at a predetermined interval.

In another embodiment, the method of the invention used to retransmit a lost packet in a fading channel, is a retransmission method with multiple copies plus delay. By transmitting multiple copies of a lost data packet for each retransmission, it is different than the traditional SR-ARQ, in which only one copy is sent, therefore the success probability of each retransmission is increased. At the same time, an adequate delay is inserted between two consecutive copies of the same lost data packet when transmitting multiple copies of a specific lost data packet. In this way the probability of meeting the bad state of the fading channel for multiple copies of the one lost packet, is decreased, i.e. success probability of each retransmission is increased. Therefore efficiency of retransmission is increase effectively and number of retransmission is decrease.

Following combines embodiment and appended figures to further describe technology of the invention.

DESCRIPTION OF THE PREFERRED EMBODIMENTS

Figure 2:
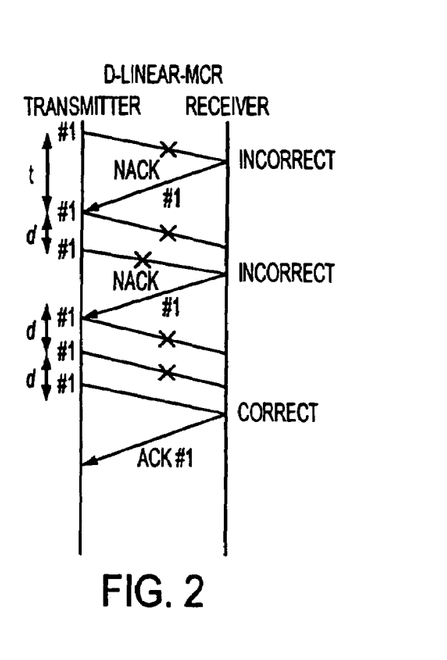
FIG. 2 is a diagram to define the number of copies for each retransmission by a linear increasing scheme according to the invention.
Figure 3:
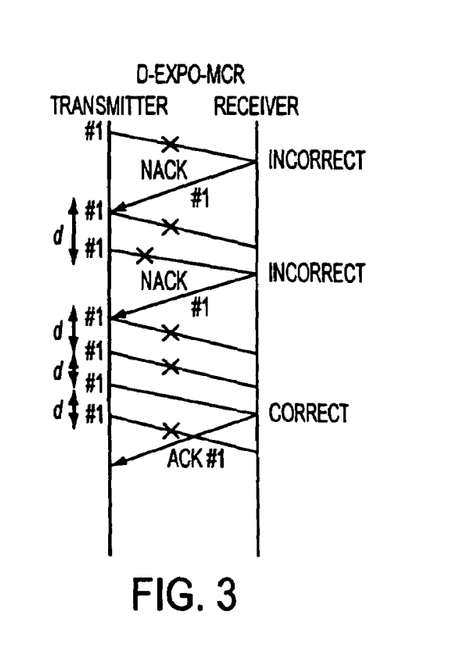
FIG. 3 is a diagram to define the number of copies for each retransmission by an exponential increasing scheme according to the invention.

FIG. 1 has been mentioned above, it would not be repeated. Referring to FIG. 2 and FIG. 3, these figures show two schemes of the invention respectively, which define the specific number of lost data copies for each retransmission. They include a linear increase scheme, as shown in FIG. 2, and an exponential increase scheme, as shown in FIG. 3, they are all related to the number of retransmissions of this (current) time. The linear increase scheme can be summarized as the number of copies for $i^{th}$ retransmission is i+1. The exponential increase scheme can be summarized as the number of copies for $i^{th}$ retransmission is $2^i$.

In FIG. 2, when a transmitter receives a NACK signal the first time for # number data packet, it retransmits two copies of # number data packet, and inserts a delay d between two consecutive copies of each # number data packet. When the transmitter receives a NACK signal the second time for # number data packet, it retransmits three copies of # number data packet, and inserts a delay d between two consecutive copies of each # number data packet; and so on. If the transmitter receives a NACK signal the third time for # number data packet, it will retransmit four copies of # number data packet, and will insert a delay d between two consecutive copies of each # number data packet (this has not been shown in the figure). FIG. 2 shows at the second time of retransmission, its third copy is received correctly.

In FIG. 3, when a transmitter receives a NACK signal the first time for # number data packet, it retransmits two copies of # number data packet, and inserts a delay d between two consecutive copies of each # number data packet. When the transmitter receives a NACK signal the second time for # number data packet, it retransmits four copies of # number data packet, and inserts a delay d between two consecutive copies of each # number data packet; and so on. If the transmitter receives a NACK signal the third time for # number data packet, it will retransmit eight copies of # number data packet, and will insert a delay d between two consecutive copies of each # number data packet (this has not been shown in the figure). FIG. 3 shows at the second time of retransmission, its third copy is received correctly.

Obviously, for the exponential increase scheme the number of copies is increased rapidly as the retransmission numbers increase, therefore efficiency is lower, but there is an improvement of a decrease of retransmission numbers and persistence time. This scheme is more appropriate in an environment where the channel condition is very bad and the propagation time is longer.

The delay d, which concerns the delay between two consecutive copies above, should optimally be a random variable. In principle, the delay should be longer than the burst channel fading period length. But it cannot be too long, because too long will increase the transmitting time of a data packet and decrease SR-ARQ performance. Nevertheless, for a time-vary channel it is a very difficult issue to define random burst channel fading period length.

Figure 4:
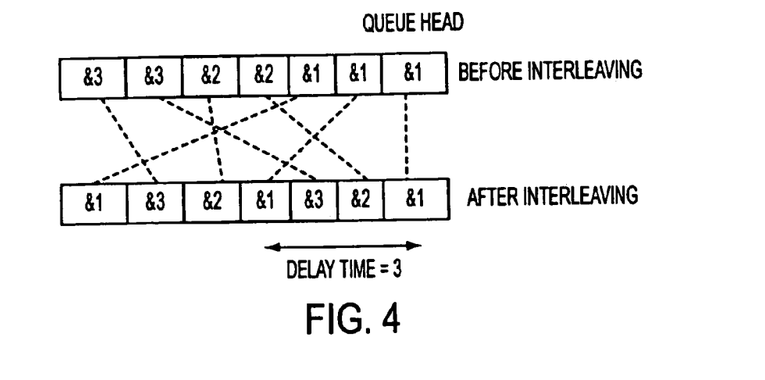
FIG. 4 is a schematic diagram of an interleaving procedure within an interleaving retransmission scheme according to the invention.

Referring to FIG. 4, a method of an interleaving procedure according to the invention is shown, which is used to solve a problem of inserting delay between every copy of the same lost data packet. Before interleaving, there are 3 copies, &1, &1, &1, of #1 data packet, 2 copies, &2 &2, of #2 data packet and 2 copies, &3 &3, of #3 data packet queuing in sequence in the queue. There is no delay between copies of the same data packet, the sending principle is first-in-first-out. After interleaving, between every & copy of the same # number data packet, one copy of two other # number data packets is inserted. For example, between every two copies of &1, a copy &2 and a copy &3, two copies in total, are inserted, between two copies of &2, a copy &3 and a copy &1, two copies in total, are inserted, between every two copies of &3, a copy &1 and a copy &2, two copies in total, are inserted. It is formed that the delay time is 3, between every copy of same data packet.

In principle the interleaving method of the present invention is similar to interleaving in channel coding, but in the present invention the interleaving object is data packets and not bits, furthermore only the multiple copies of the retransmitted lost data packet are interleaved, and the interleaving is before retransmission. It is interleaving transmission. FIG. 4 shows after interleaving, multiple copies, belonging to the same lost data packet, are transmitted in sequence after delay. The delay time is the time length of the number of different sequence number data packets queuing in the interleaving queue. If the burst channel fading period length is long, then the number of different sequence number data packets queuing in the interleaving queue is more and the delay is longer.

Figure 5:
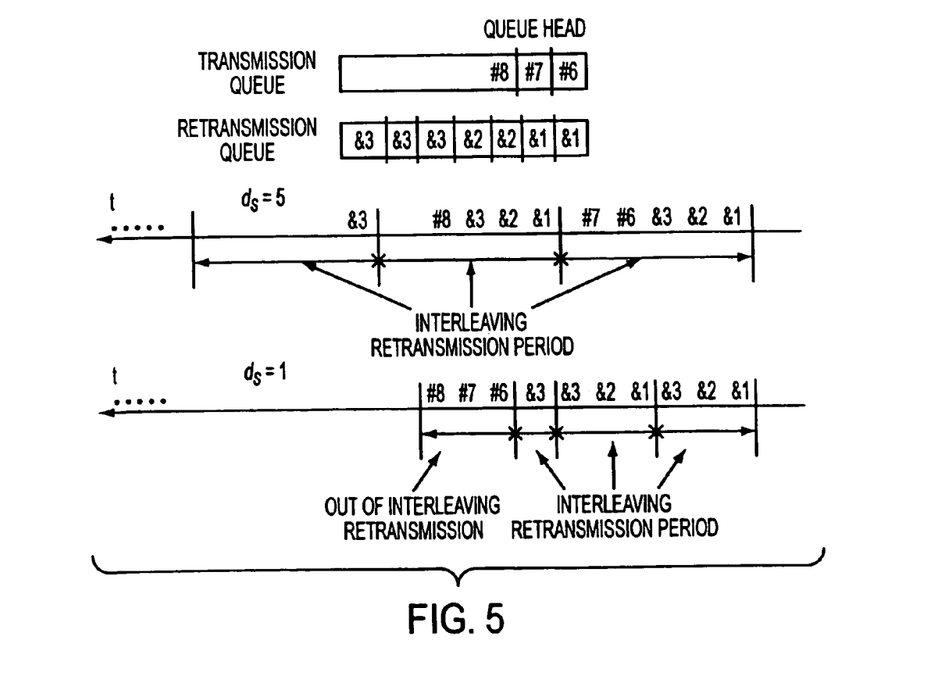
FIG. 5 is a diagram representing an implementation scheme for an interleaving retransmission scheme according to the invention.

FIG. 5 shows an embodiment for the scheme of interleaving retransmission in the invention. The transmitter needs to set three queues, including transmission queue, retransmission queue and buffer queue. The transmission queue, marked with #, is used to store new transmitting data packets. The retransmission queue, marked with &, is used to store multiple copies of specific data packets needed to be retransmitted. The buffer queue, which does not belong to the scheme of the invention, is used to store the data packets having been transmitted but without receiving the acknowledgement signal. Suppose that #6, #7 and #8 are arranged in sequence from queue head in the transmission queue. In retransmission queue there are arranged in sequence with two copies, &1, &1, of #1 data packet, two copies, &2, &2, of #2 data packet, and three copies, &3, &3, &3, of #3 data packet. It is known from the retransmission queue that the number of different retransmitted packets is 3. In the retransmission queue, the number of the same data packet copies is acquired, first according to the current retransmission number then calculating with the linear increase principle or exponential increase principle, all the copies of same data packet are stored continuously.

In step 1, at first it is necessary to determine whether the retransmission queue is empty or not; if the retransmission queue is empty, every data packet in the transmission queue is transmitted according to the first-in-first-out principle; if the retransmission queue is not empty, then it enters the interleaving transmission state.

Entering the interleaving transmission state is implemented by setting the length of the interleaving retransmission interval. In order to control the minimum value of multiple copies transmission delay for specific data packet, the minimum value $d_s$ of interleaving retransmission interval length should be set (it can be determined by the specific mobile communication system). In the figure, two conditions are set, they are $d_s=5$ and $d_s=1$, respectively. The length of the interleaving retransmission interval is a value which should be chosen as the largest one among the minimum value ($d_s$) of the interleaving retransmission interval length and the maximum value of number (in the figure example it is 3) of different data packets in retransmission queue.

In step 2, interleaving transmission is proceeded, it is started to form every interleaving retransmission interval.

When $d_s=5$, the timer is set to 5. From the retransmission queue, one copy of every retransmission data packet is selected, &1, &2 and &3, and they are transmitted by the first-in-first-out principle. When the transmission is finished, and if the timer is not over, then data packets #6 and #7, in the transmission queue, are transmitted by the first-in-first-out principle, until the timer is over, the first interleaving retransmission interval is ended. At this moment, if the retransmission queue is not empty, the next interleaving retransmission interval is started. Again, from the retransmission queue, one copy of every retransmission data packet is selected, &1, &2 and &3, and they are transmitted by the first-in-first-out principle. When the transmission is finished, and if the timer is not over, continuously data packet #8, in the transmission queue, is transmitted; when it is finished, and if the timer is not over, stop transmission until the timer is over, the second interleaving retransmission interval is ended. At this moment, if the retransmission queue is still not empty, the next interleaving retransmission interval is started. Again, from the retransmission queue one copy of #3 data packet, &3, is selected and transmitted; when it is finished, and if the timer is not over and the transmission queue is empty, stop transmission until the timer is over, the third interleaving retransmission interval is ended. As the retransmission queue is now empty, the interleaving transmission will be ended, with first-in-first-out principle, new data packet transmission in transmission queue is started (if there are new data packets in the transmission queue).

When $d_s=1$, the timer is set to 1. From the retransmission queue, one copy of every retransmission data packet is selected, &1, &2 and &3, and they are transmitted by the first-in-first-out principle; When the transmission is ended the timer is over, so the first interleaving retransmission interval is ended. Because the retransmission queue is not empty, the next interleaving retransmission interval is started. Again, from the retransmission queue, one copy of every retransmission data packet is selected, &1, &2 and &3, and they are transmitted by the first-in-first-out principle; when the transmission is finished, the timer is over, so the second interleaving retransmission interval is ended. At this moment, the retransmission is still not empty, so the next interleaving retransmission interval is started. Again, from the retransmission queue one copy of #3 data packet, &3, is selected and transmitted; when it is finished, the timer is over, so the third interleaving retransmission interval is ended.

In step 3, when the retransmission queue is empty, the interleaving retransmission state is ended; with the first-in-first-out principle, data packets in the transmission queue are transmitted. As shown in the figure when $d_s=1$, after the third interleaving retransmission interval is ended, it is started to transmit data packets in transmission queue, #6, #7, and #8.

Two real examples in FIG. 5 show that the length of the interleaving retransmission interval is the retransmission delay of multiple copies of every lost packet. In reality, the length of the interleaving retransmission interval is determined by d, and the number of lost data packets; $d_s=1$ is a special case, the length of interleaving interval is only determined by the number of successively lost packets.

Figure 7:
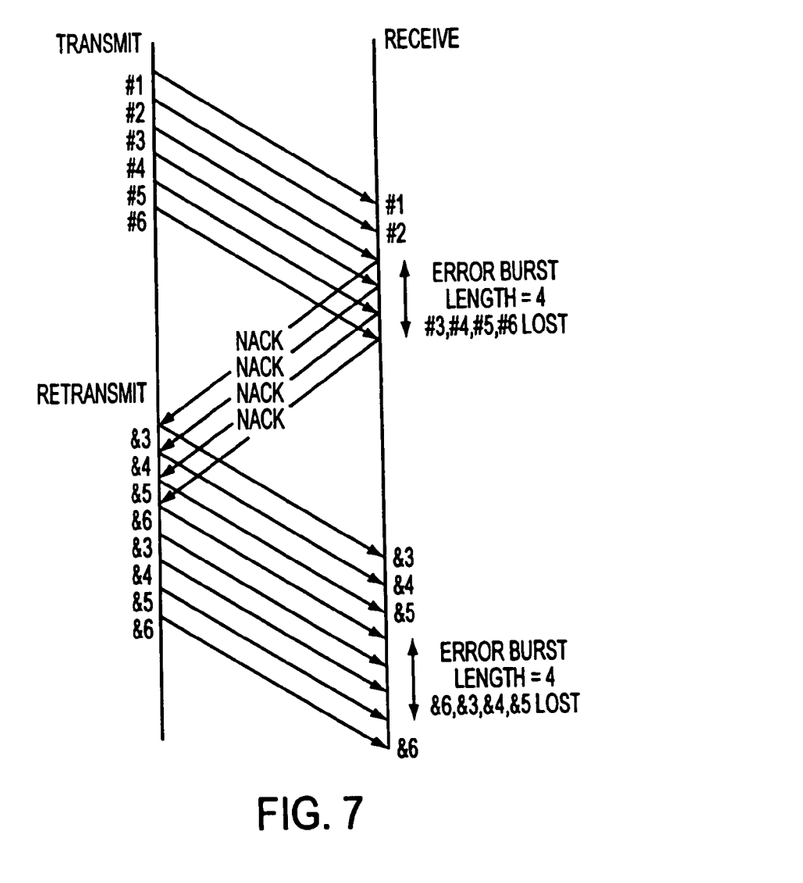
FIG. 7 is an analysis diagram of effectiveness for an interleaving retransmission scheme according to the invention.

With reference to FIG. 7, in reality, the interleaving retransmission procedure of the invention is using the number of continuously lost packets in the last transmission to predicate the length of current channel fading period. In an ideal case, the length of channel fading period is unchanged, only one time of interleaving retransmission is needed, i.e. every lost data package needs to transmit only two copies.

FIG. 7 shows that when the number of continuously lost packets in the last transmission is 4 (#3, #4, #5, #6), the length of predicting channel fading period is 4. After one time of interleaving retransmission, that is every lost data packet only transmits two copies, &3, &4, &5, &6 and &3, &4, &5, &6, the receiver receives the retransmission data packets &3, &4, &5, &6 successfully.

Therefore, the value of the timer is decided, based on the number of continuously lost packets in the last transmission or based on the measurement result of the technique by which the fading pitch is measured.

Figure 6:
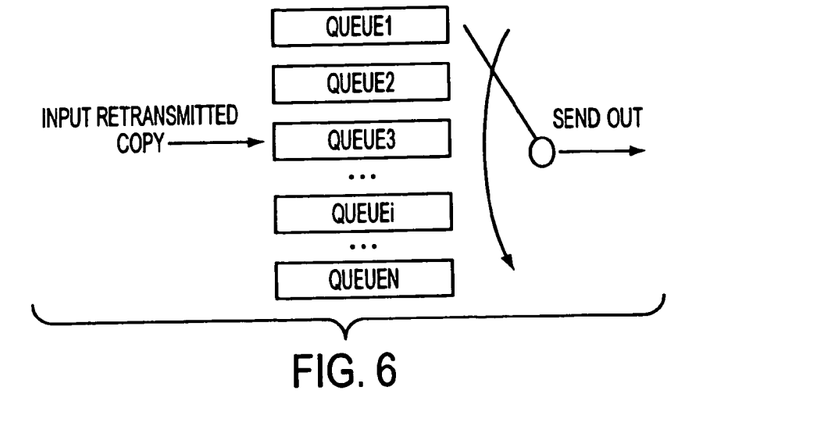
FIG. 6 is a diagram, which is another implementation scheme for an interleaving retransmission scheme according to the invention.

Referring to FIG. 6, it shows another embodiment of the method for multiple copies plus delay retransmission scheme of the invention. It is a multiple queues polling retransmission method. Compared with the embodiment shown in FIG. 5, the interleaving transmission method shown in FIG. 6 is different.

The transmitter also needs three queues, including transmission queue, retransmission queue and buffer queue. The transmission queue is used to store new data packets to be transmitted. The retransmission queue is used to store multiple copies of every specific data packet needed to be retransmitted. The buffer queue is used to store the data packets having been transmitted but without receiving the acknowledgement signal.

When the retransmission queue is not empty, it enters an interleaving retransmission state, polling transmission is started.

Step 1. Set N individual copy queues, the sequence numbers are copy queue 1, copy queue 2 , copy queue 3, ... , copy queue i, ... , copy queue N, one copy of every specific retransmission packet will be stored in each copy queue in sequence. For example, two copies of #1 retransmission data packet, &1 and &1, are stored in copy queue 1 and copy queue 2 , respectively, two copies of #2 retransmission data packet, &2 and &2, are stored after copy &1, in copy queue 1 and copy queue 2 respectively; three copies of #3 retransmission data packet, &3, &3 and &3, are store, after copy &2, in copy queue 1, copy queue 2 and copy queue 3 respectively. This means if a retransmission data packet has k individual copies, then the k copies are stored in copy queue 1, copy queue 2 , . . . , copy queue k, respectively.

Step 2. Starting from copy queue 1 to copy queue N, they are transmitted in sequence. Then, if any copy queue is not empty, it will start again from copy queue 1 to copy queue N transmitted in sequence until all the copy queues are empty, and the polling transmission procedure is ended. When transmitting, only after the current copy queue is empty, then the next copy queue can be transmitted. This means only when the $i^{th}$ copy queue is empty, then the $(i+1)^{th}$," copy queue can be transmitted. Furthermore in spite of whether there is any empty copy queue from $i^{th}$ copy queue to $N^{th}$ copy queue in real, it must be transmitted in sequence until the $N^{th}$ copy queue.

Step 3. When all N individual copy queues are empty, the polling transmission procedure is ended, and transmitting new data packet in the transmission queue is started. Considering that in many mobile communication systems, the numbers of retransmission are controlled in real operation, for example, in IS-99, the numbers of retransmission cannot exceed 3. This means that in one retransmission, the copy number will not exceed a certain fixed value. If using the linear increase method of the invention, then in one retransmission the copy number does not exceeded 4. If using the exponential increase method of the invention, then in one retransmission the copy number does not exceeded 8. When using the polling transmission of multiple queues, the number of copy queue can be set respectively as 4 and 8, and the implementing procedure will be greatly simplified.

Therefore, when limiting the numbers of retransmission, the effect of the second method, polling retransmission method, is same as the first method with $d_s=1$, but the implementation of polling retransmission method is simpler.

Figure 8:
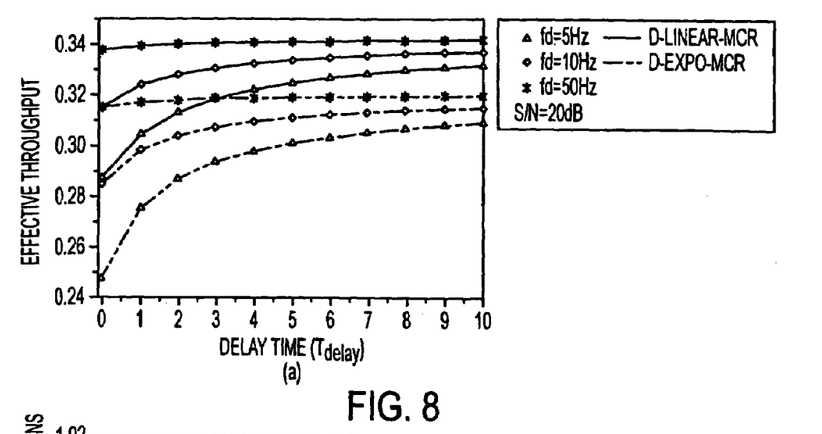
FIGS. 8–10 show examples of the emulated relationship curve diagrams between Delay Time with Effective Throughput, Delay Time with a Mean of the Number of Retransmissions and Delay Time with Variation of the Number of Retransmissions, respectively.
Figure 9:
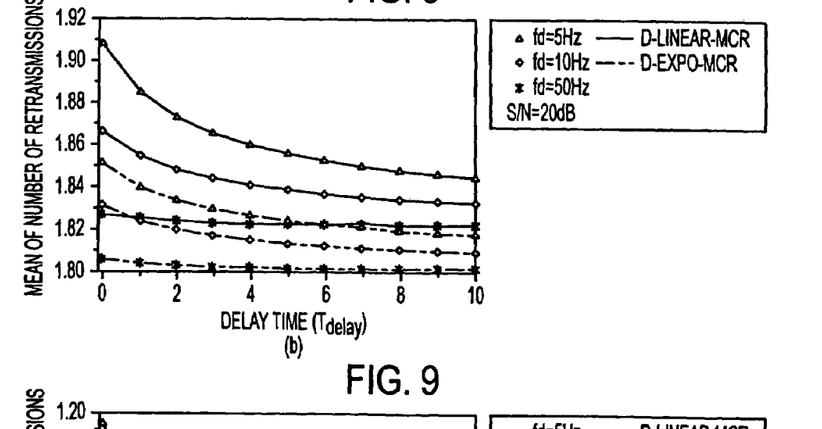
Figure 10:
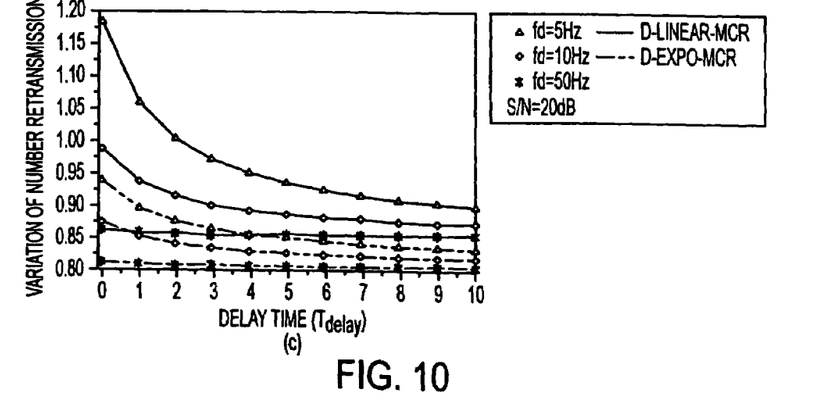

Reference is now made to FIG. 8, FIG. 9 and FIG. 10. Under the conditions of a 20 db signal-to-noise ratio (S/N), and different channel fading speed $f_d$ (Hz), such as 5 Hz (represented by triangle), 10 Hz (represented by lozenge) and 50 Hz (represented by *), with an emulation approach, shown are the result of the relationship between delay time ($T^{delay}$) and effective throughput, delay time ($T_{delay}$) and the mean of the number of retransmissions, and delay time ($T_{delay}$) and variance of the number of retransmissions, respectively. In the figures, a solid line represents Delay-Linear-Multiple-Copies-Retransmission scheme, dot dash line represents Delay-Exponent-Multiple-Copies-Retransmission scheme.

The figures show that slow fading speed will lead to decreased throughput, increase mean of the number of retransmission and variance of the number of retransmission. This is because slow fading speed has a larger correlation and longer fading period length, which increases the probability of successive lost packets.

Besides, directing to the traditional Selective Retransmission (SR) scheme, the Delay-Linear-Multiple-Copies-Retransmission (D-Linear-MCR) scheme and the Delay-Exponent- Multiple-Copies-Retransmission (D-Expo-MCR) scheme, it can further be seen the influence of channel round trip time to effective throughput, mean of number of retransmissions and variance of number of retransmissions. The result is that: along with increased round trip time, the Delay-Multiple-Copies-Retransmission scheme of the invention will get better performance. This is because after passing a longer round trip time, the correlation of successive retransmission is decreased.

In addition, also directing to the traditional Selective Retransmission scheme, the Delay-Linear-Multiple-Copies-Retransmission scheme and the Delay-Exponent-Multiple-Copies-Retransmission scheme, with different channel fading speed (as 10 or 100 Hz), it can also be seen the influence of signal-to-noise-ratio (SNR-db) to effective throughput, mean of number of retransmissions and variance of number of retransmissions.

The result is: along with the decrease of signal-to-noise-ratio, especially when the signal-to-noise-ratio is less than 25 db, the performance of delay multiple copies retransmission is decreased greatly.

Figure 11:
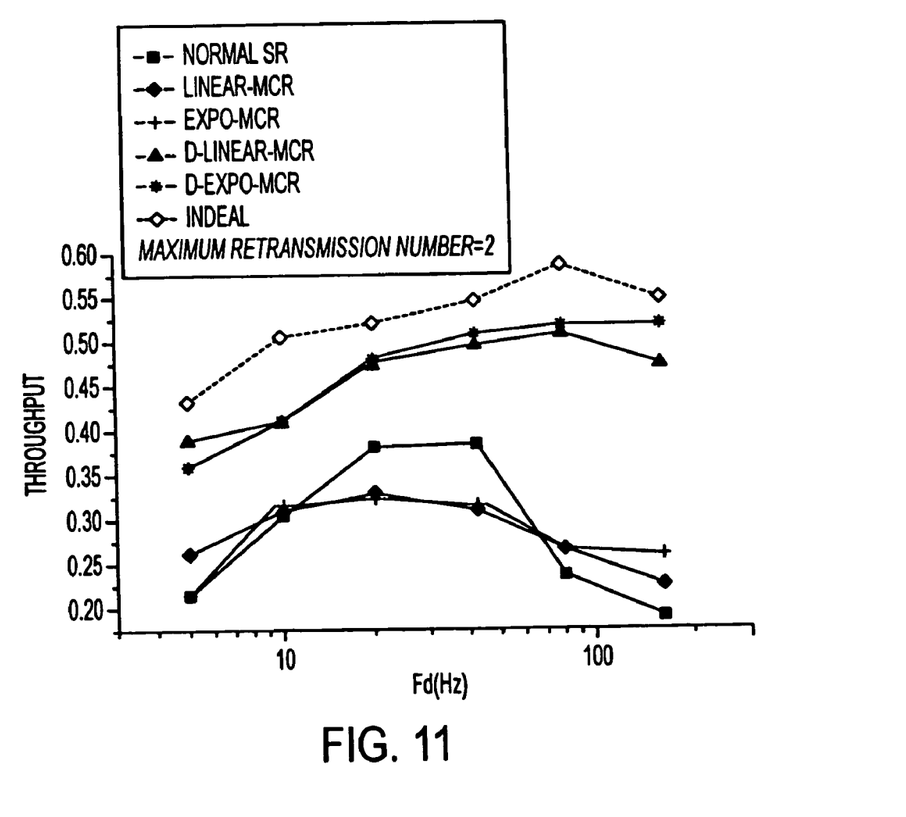
FIG. 11 shows an example of the emulated curve diagram of the improvement of transmission performance after using the invention scheme.

FIG. 11 is a simulation curve diagram of transmission performance improvement according to the method of the invention. In a typical mobile communication system, emulating different ARQ schemes, the performance of Transfer Control Protocol (TCP) have been acquired. In emulation, the following conditions are taken:

The capacity of wired network is 100 Mbps;
The capacity of wireless link is 2 Mbps;
The propagation delay of wired network is 50 ms;
The propagation delay of wireless network is 10 ms;
The link layer packet size is 53 bytes;
The TCP packet length is 576 bytes;
The buffer in the base station can store at most 384 link layer packets;

The maximum times of retransmission are 2 (copies are 3 or 4);

The minimum value of interleaving retransmission interval $d_s$ is 1;

Two state Markovian model is used to simulate fading channel.

FIG. 11 compares the end-to-end TCP throughput of different ARQ schemes. The X-axis represents channel fading speed $f_d$ (Hz), and the Y-axis represents throughput. The dot line connected with hollow lozenge blocks, shows the ideal state without limiting numbers of retransmission (unlimited retransmission). The solid line connected with solid square blocks, shows performance of traditional selective retransmission (SR-ARQ) scheme. The solid line connected with solid lozenge blocks, shows performance of Linear-Multiple-Copies-Retransmission (Linear-MCR) scheme. The solid line connected with + symbol, shows performance of Exponent-Multiple-Copies-Retransmission (Expo-MCR) scheme. The solid line connected with solid triangle shape, shows performance of Delay-Linear-Multiple-Copies-Ret (D-Linear-MCR) scheme. The solid line connected with + shape, shows performance of Delay-Exponent-Multiple-Copies-Retransmission (D-Expro-MCR) scheme. The results show: the invention scheme compares with traditional SR-ARQ scheme, a better TCP end-to-end throughput can be acquired. Experience also shows performance of the D-MCR scheme is better than MCR scheme, while different multiple copies schemes (Linear and ExPro) have no much difference.

In general, in the fast fading channel, because the mean lost rate of data packets is higher, performance of the Exponent scheme is better than the Linear scheme, throughput is large. But in the slow fading channel, longer fading period length will greatly decrease the effectiveness of the multiple copies scheme, so at the lower effective throughput condition, throughput of the Exponent scheme will be lower than the Linear scheme. Therefore, it should select different multiple copies scheme for different requirement.

What is claimed is:

1. A method for retransmission of a lost packet in a fading channel in a communications system including a transmitter and a receiver, said method comprising the steps of:
   receiving at the transmitter a negative acknowledgement (NACK) from the receiver, said NACK pointing to a specific data packet; and,
   re-transmitting multiple copies of the specific data packet with a delay inserted between each consecutive copy wherein the inserted delay is a function of a fading period.

2. The method according to claim 1, wherein with regard to said multiple copies, the number of copies of the specific data packet to be retransmitted is based on a number of times the specific data packet has been re-requested (NACK-ed), wherein the number of copies increases as the number of retransmissions increases.

3. The method according to claim 1, wherein the number of copies of the specific data packet to be retransmitted increases linearly along with the number of retransmissions, such that when the number of retransmissions of the specific data packet is $i^{th}$ retransmission, then the number of copies of the specific data packet to be re-transmitted is i+1.

4. The method according to claim 1, wherein the number of copies of the specific data packet to be retransmitted increases exponentially along with the number of retransmissions, such that when the number of retransmissions of the specific data packet is $i^{th}$ retransmission, then the current number of copies of the specific data packet to be re-transmitted is $2^i$.

5. The method according to claim 1, further includes the following steps:
   setting at least two queues, including a transmission queue and a retransmission queue, at the transmitter;
   storing new data packets, which will be transmitted, in the transmission queue, and storing copies of a data packet, which will be retransmitted, in the retransmission queue;
   determining whether the retransmission queue is empty or not;
   if the retransmission queue is empty, then transmitting data packets in the transmission queue by a first-in-first-out principle; and
   if the retransmission queue is not empty, then transmitting the copies of the data packet in the retransmission queue by interleaving transmission.

6. The method according to claim 5 wherein said transmitting the copies of the data packet in the retransmission queue interleaving transmission includes the steps of:
   setting a minimum value for a length of time of an interleaving retransmission interval by a timer;
   selecting from the retransmission queue one copy of each retransmission data packet, and transmitting them in the interleaving retransmission interval time length by the first-in-first-out principle; and
   if within the minimum value of the interleaving retransmission interval time length, all of the selected one copy of each retransmission data packet has been transmitted, then with the first-in-first-out principle, transmitting the data packets in the transmission queue until the interleaving retransmission interval is ended based on the minimum value of the interleaving retransmission interval time length which is set by the timer.

7. The method according to claim 6, wherein if within the minimum value of the interleaving retransmission interval time length, all of the selected one copy of each retransmission data packet in the retransmission queue has been transmitted, and the transmission queue is also empty, then transmission is stopped until the minimum value, set by the timer, of the interleaving retransmission interval time length ends this interleaving retransmission interval.

8. The method according to claim 6, wherein when an interleaving retransmission interval ends, if the retransmission queue is not empty, then a new interleaving retransmission interval is started; and if the retransmission queue is empty, then the interleaving retransmission is ended and the data packets in the transmission queue are transmitted using the first-in-first-out principle.

9. The method according to claim 6, wherein the length of the interleaving retransmission interval is the larger of the following two 1) said minimum value of interleaving retransmission interval time length and 2) said maximum number of different data packets in the retransmission queue.

10. The method according to claim 5, wherein said retransmission queue includes copy queues, each copy queue holding one copy of each specific data packet requiring re-transmission, the specific data packets requiring retransmission each having a sequence number, and each copy queue holding the one copy of each specific data packet requiring re-transmission according to the sequence number.

11. The method according to claim 5, wherein said retransmission queue includes copy queues, and said interleaving retransmission of data packet copies in the retransmission queue further includes: starting from a first copy queue of the retransmission queue, transmitting by the first-in-first-out principle every data packet copy in each copy queue until the last copy queue; and when all the copy queues are empty, ending the interleaving transmission and starting to transmit the data packets in said transmission queue.

12. The method according to claim 11, wherein transmitting every data packet copy in a next copy queue is executed only when the current copy queue is empty, and then the next copy queue can be transmitted.

13. The method according to claim 11, wherein the sequence of transmitting from the first copy queue until the last copy queue, includes copy queues which are not storing a data packet copy.

14. The method according to claim 11, wherein the number of copy queues is equal to or greater than the number of retransmission copies of the specific data packet.

15. A method for retransmission of a lost packet in a fading channel, in a communications system including a transmitter and a receiver, comprising the following steps:
   setting at least two queues in the transmitter, including a transmission queue and a retransmission queue;
   storing new data packets, which will be transmitted, in the transmission queue, and storing the copies of the lost data packet, the number of which is defined by a number of retransmission, in the retransmission queue;
   determining whether the retransmission queue is empty or not, and when the current retransmission queue is empty, transmitting by a first-in-first-out principle, data packets in the transmission queue; and when the current retransmission queue is not empty transmitting the data packet copies in the retransmission queue with an interleaving transmission;
   setting a minimum value of time length of interleaving retransmission interval by a timer, selecting one copy of every retransmission data packet from the retransmission queue, transmitting them in every interleaving retransmission interval by the first-in-first-out principle;
   if before the end of an interleaving retransmission interval, one copy of every retransmission data packet in the retransmission queue has been transmitted, then with first-in-first-out principle, transmitting data packets in the transmission queue until the end of the minimum value, set by the timer, of the interleaving retransmission interval time length, and then, ending the interleaving retransmission interval and starting next one interleaving retransmission interval;
   if before the end of the minimum value of the interleaving retransmission interval time length, one copy of all data packets in the retransmission queue has been transmitted and the transmission queue is empty, then stopping transmission until the end of the minimum value, set by the timer, of the interleaving retransmission interval time length, and then, the interleaving retransmission interval will be ended and starting the next interleaving transmission interval; and
   when an interleaving retransmission interval is ended and the retransmission queue is empty, then transmitting data packets in the transmission queue by first-in-first-out principal.

16. A method for retransmission of lost packets in a fading channel, in a communications system including a transmitter and a receiver, the method comprising the following steps:
   setting at least two queues in the transmitter, including a transmission queue and a retransmission queue;
   storing new data packets, which will be transmitted, in the transmission queue, and storing copies of lost packets, the number of which is defined by a current number of retransmission, in the retransmission queue;
   determining whether the retransmission queue is empty or not, and when the retransmission queue is empty, transmitting using a first-in-first-out principle, data packets in the transmission queue; and
   when the current retransmission queue is not empty, transmitting the data packet copies in the retransmission queue by multiple queue polling transmission;
   setting copy queues in the retransmission queue with sequence number, each copy queue including one copy of different data packet, starting from a first copy queue, and with first-in-first-out principle, transmitting every data packet copy in each copy queue in sequence, starting only after sending out all the copies in one queue the next copy queue transmission until the final copy queue, and when all the copy queues are empty, ending the polling transmission and starting the transmission of said transmission queue.

17. A method for retransmission of a lost packet in a fading channel, in a mobile communication system including a transceiver, comprising the steps of:
   transmitting by said transceiver a packet to a receiver;
   when the transceiver receives information which indicates that the receiver does not receive a specific packet generating a plurality of copies of the specific packet; and
   retransmitting by said transceiver the copies of the specific packet in order at predetermined intervals the predetermined intervals including an inserted delay wherein the inserted delay is a function of a fading period.

* * * * *

UNITED STATES PATENT AND TRADEMARK OFFICE
CERTIFICATE OF CORRECTION

PATENT NO. : 7,069,490 B2 Page 1 of 1
APPLICATION NO. : 09/933893
DATED : June 27, 2006
INVENTOR(S) : Zhisheng Niu et al.

It is certified that error appears in the above-identified patent and that said Letters Patent is hereby corrected as shown below:

On title page, Item (30) col. 1, should read,
--(30) Foreign Application Priority Data October 27, 2000   (CN) …………………………..00130335

Signed and Sealed this

Seventeenth Day of October, 2006

JON W. DUDAS
*Director of the United States Patent and Trademark Office*